Dec. 21, 1965     D. R. HODGE ETAL     3,224,045
MOLD FOR MAKING A COMBINED ELECTROMAGNETIC
ARMATURE AND CONTACT CARRIER
Original Filed June 30, 1961     3 Sheets-Sheet 3

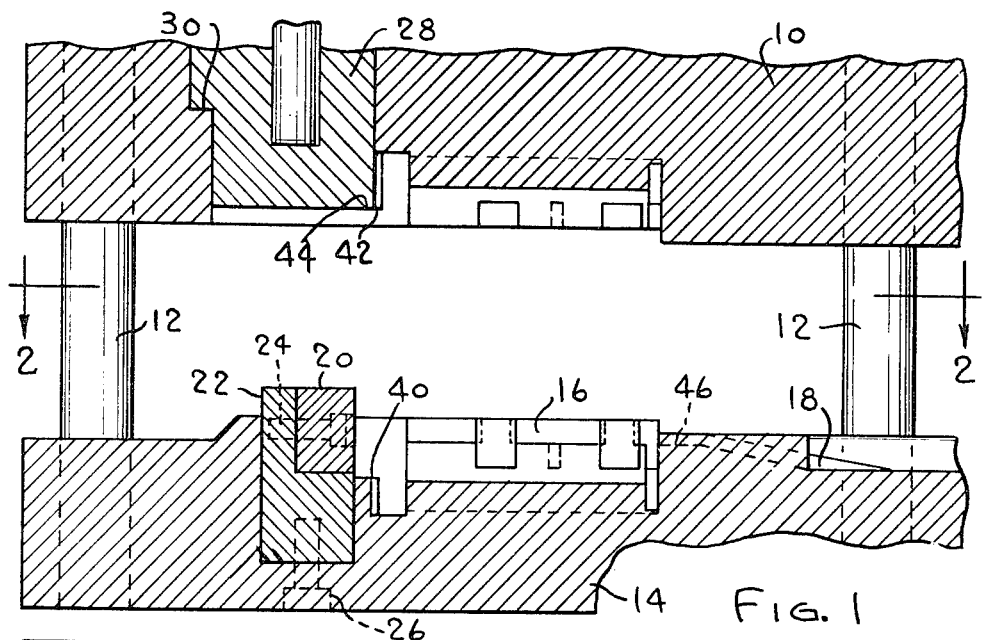
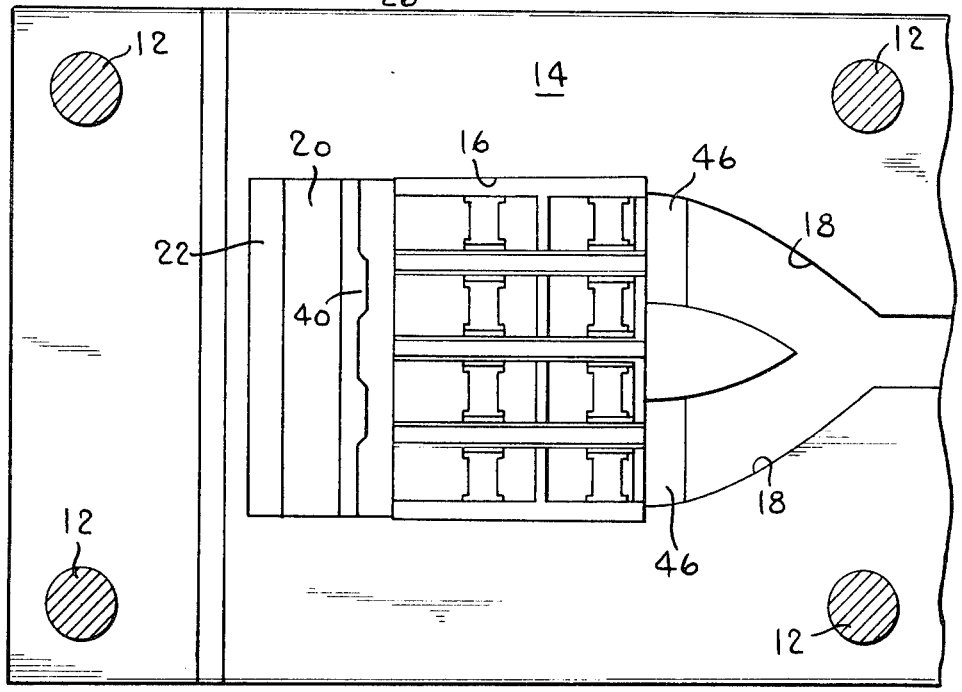
FIG. 1
FIG. 2

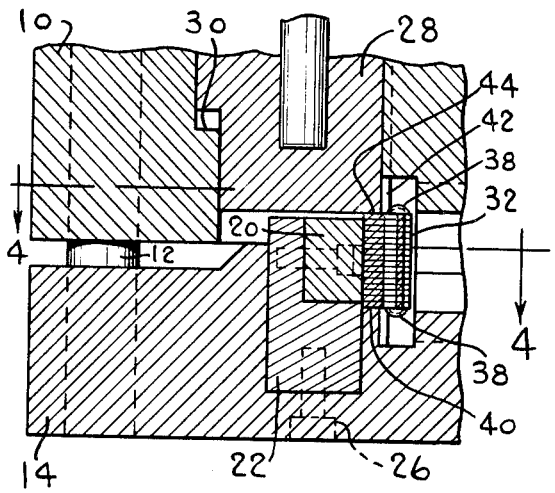
FIG. 3
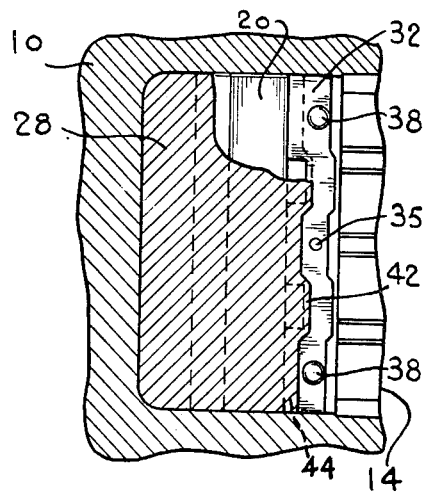
FIG. 4
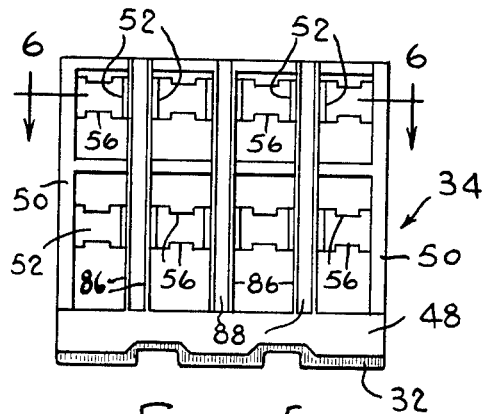
FIG. 5
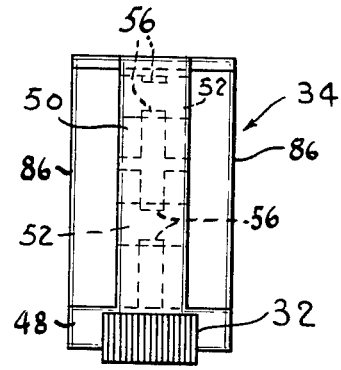
FIG. 7
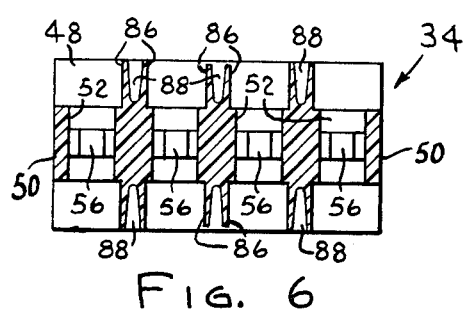
FIG. 6
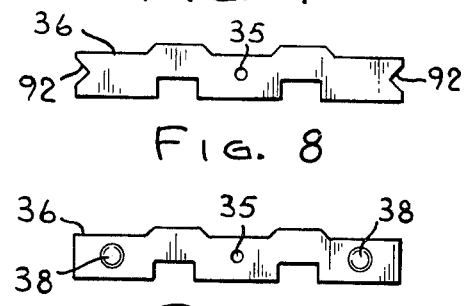
FIG. 8
FIG. 9
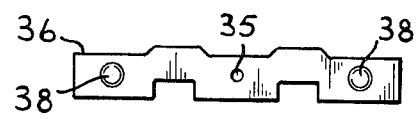
FIG. 10

United States Patent Office 3,224,045
Patented Dec. 21, 1965

3,224,045
MOLD FOR MAKING A COMBINED ELECTRO-
MAGNETIC ARMATURE AND CONTACT
CARRIER
Donald R. Hodge, Brookfield, Edmund A. Janicki, Brown
Deer, and Carl F. Meidel, Wauwatosa, Wis., assignors
to Cutler-Hammer, Inc., Milwaukee, Wis., a corporation
of Delaware
Original application June 30, 1961, Ser. No. 121,248.
Divided and this application Mar. 2, 1964, Ser. No.
348,383
2 Claims. (Cl. 18—36)

This application is a division of application Serial No. 121,248, filed June 30, 1961.

This invention relates to an improved mold for making molded electromagnetic contact carriers.

A primary object of the invention is to provide a mold affording integral molding of an electromagnetic armature member into the body of a contact carrier.

A further object is to provide a mold of the aforementioned type which is characterized by effecting positive securement of the armature member in the closed mold so that is cannot be displaced in any direction during the inflow and setting of the molding material.

Other objects and advantages of the invention will hereinafter be pointed out in connection with preferred embodiments which will now be described.

These objects are accomplished by molding the body of the contact carrier assembly onto the armature to form a single integral unit. The armature is made up of a number of laminations which are stacked on their side in one part of a transfer type mold and held in the stacked position by a permanent magnet in the mold. The other part of the mold is then closed on the first part with the armature squeezed in the mold by a pad that is biased to provide sufficient pressure so that the armature position is not affected by the pressure of the material that is transferred into the mold to form the body of the contact carrier assembly. The mold is designed to compensate for the shrinkage of the material which occurs when the material used in the body of the contact carrier assembly is cooled. The armature is provided with additional means for firmly embedding the armature in the material as it shrinks so that the armature becomes locked by mechanical action in the body of the contact carrier assembly.

In the drawings:

FIGURE 1 is a side view in section of the opened mold;

FIG. 2 is a top plan view taken on line 2—2 of FIG. 1 showing the lower portion of the mold;

FIG. 3 is a sectional view of the mold closed on the armature;

FIG. 4 is a view taken on line 4—4 of FIG. 3 showing the squeeze pad;

FIG. 5 is a side elevation view of the contact carrier assembly;

FIG. 6 is a section view taken on line 6—6 of FIG. 5 showing the switch contact mounts;

FIG. 7 is an end view of the contact carrier assembly;

FIG. 8 is a side view of an armature lamination;

FIG. 9 is a side view of a modified armature lamination;

FIG. 10 is a side view of another modified armature lamination;

Figure 12:
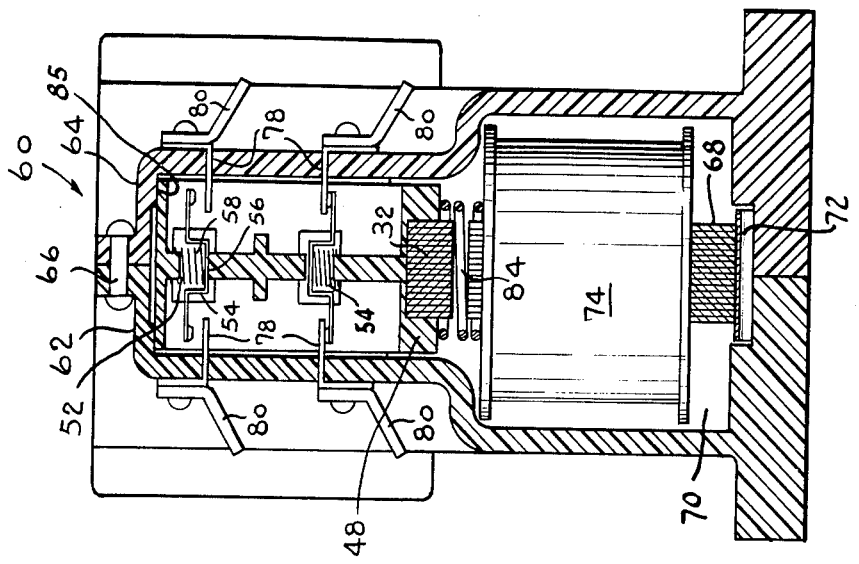
FIG. 12 is a side view partly in section of the relay.

Referring to the drawings in detail, the mold includes an upper mold section 10 vertically movable on posts 12 toward and away from a stationary lower mold section 14. The mold shown is designed for use in a transfer type molding method but other molding methods may be used if desired, such as compression molding, thermosetting or injection molding.

The stationary lower mold section has a mold cavity 16 that is connected to channels 18 through which the material is transferred from a pressurizing cavity into the mold cavity. A permanent magnet 20 is mounted on a block 22 of non-magnetic material such as stainless steel or the like by screws 24 and the block is held in the mold by screws 26. The upper mold section has a pad 28 vertically movable with respect to the upper mold section and biased against stop 30 by any suitable means such as a spring or a hydraulic system (not shown).

The armature 32 for the contact carrier assembly 34 is made up of a number of laminations 36 or magnetizable material such as ferrous metal or the like having a central locating hole 35 and generally held by rivets 38. The armature is placed in the mold on its side on rest 40 and its base or sealing face against the permanent magnet. The magnet force of the magnet will hold the armature in position during the time that the upper section of the mold is brought down into engagement with the lower section of the mold. The armature, when the laminations have been assembled, may be finished ground before it is placed in the mold to provide an accurate surface from which the distance to the contact supporting windows can be accurately obtained. The squeeze pad is contoured at 42 to conform to the shape of the armature and will engage the armature along edge 44 forming a seal along the line of engagement. The pad will back up slightly off of the stop 30 so that the full force of the bias on the pad will be applied to the armature squeezing the armature between the pad and rest 40 in the mold. It can be seen that the magnet assures that the armature does not tip in the mold during the time that the upper mold section is closed and the pad squeezes the armature with sufficient force to assure that the material for the body of the contact carrier assembly does not move the armature during the molding process.

The plastic material is then transferred through the channels into the mold at extremely high pressure in the order of ten to fifteen thousand pounds per square inch. The channels narrow at 46 so that the final contact carrier assembly can be easily broken off of the material which has set in the channels. Since the plastic material has a relatively high shrinkage factor, the mold is made wider at the right in FIG. 2 than at the left where the metal armature is located.

The contact carrier assembly is removed from the mold and includes a base section 48 in which the armature is embedded and a vertical section 50 projecting upwardly from the base section. Two rows of windows 52 are provided in the vertical section of the contact carrier assembly with a movable contact 54 mounted on a molded projection 56 in each window and held therein by springs 58. It can be seen that the movable contacts can be placed in either a normally open position (as seen in the upper window, FIG. 12) or a normally closed position (as seen in the lower window, FIG. 12) by merely reversing the position of the movable contact on the projections.

Figure 11:
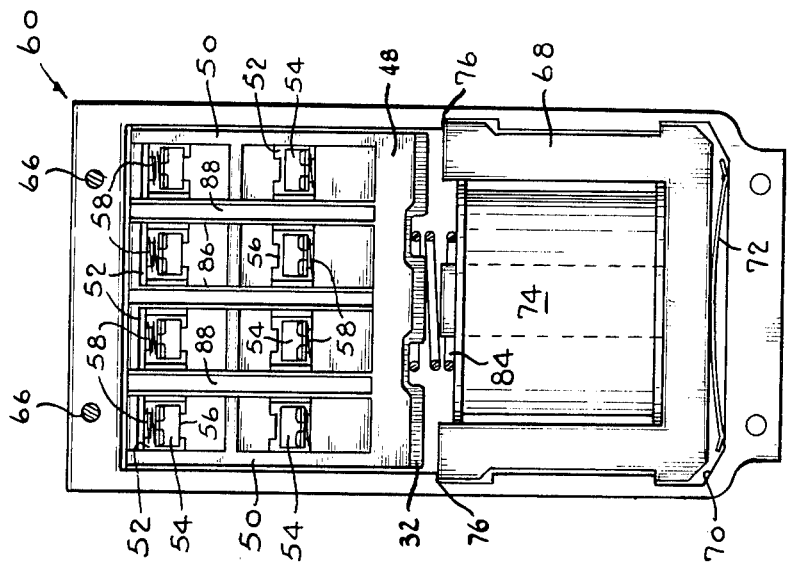
FIG. 11 is an elevation view of an electromagnetic relay with the contact carrier assembly in position.

Referring to FIGS. 11 and 12, the relay housing 60 includes two symmetrical sections 62 and 64 secured together by rivets 66. A magnetic frame 68 is positioned within a lower chamber 70 in the housing on a leaf spring 72 and supports a coil 74. The magnetic frame is biased upwardly by the leaf spring with the outer edges of the pole faces of the frame engaging shoulders 76 in the housing. Stationary contacts 78 project through apertures in the sides of the housing and are riveted to the housing and to the terminal brackets 80.

The contact carrier assembly is mounted within the housing on coil spring 84 which biases the contact carrier assembly upwardly against an internal surface 85 in the housing. It can be seen that the distance from surface 85 to the fixed contacts 78 in the relay housing is fixed when the relay housing is molded. The position of the contact on the contact carrier assembly can then be predetermined from the distance from the face of the magnetic frame 68 to the windows. This eliminates the necessity of adjusting for wear allowance between the armature and the body of the contact carrier assembly when the armature is molded therein which adjustment would be necessary if these parts were otherwise connected. Each window in the housing is insulated from the adjacent windows by dividers 86 which have grooves 88 that cooperate with ribs (not shown) in the housing to insulate the contacts from each other.

The contact carrier assembly is thus formed in a single molding operation as a single integral unit. The mold is designed to prevent the armature from tipping in the mold prior to molding and is squeezed by a pad in the mold to prevent possible displacement when the molding material is transferred therein. The armatures can be provided with various means for mechanically locking the armature in the base of the contact carrier assembly. In FIG. 8, notches 92 are provided at each end of the armature and the mold material can shrink thereon. In FIG. 9, the rivet heads 38 project slightly outward from the sides of the armature and will become embedded in the mold material. In FIG. 10, holes 94 are provided at each end so the mold material can flow through the laminations.

Although only a few embodiments of the present invention have been illustrated and described, it will be apparent to those skilled in the art that various changes and modifications may be made therein without departing from the scope of the appended claims.

We claim:
1. A mold for a contact carrier assembly having a magnetically responsive armature therein comprising, a fixed member and a movable member, magnetic means within one of said members for holding said armature in position, and a member movably mounted in the other mold member and when biased inwardly engaging said armature when the members are closed to prevent displacement of said armature by the pressure of the molding material and to compensate for variation in thickness of armatures.

2. A mold for a contact carrier assembly having a magnetically responsive laminated armature comprising a fixed mold member having a permanent magnet therein and a supporting surface adjacent the magnet to support the armature prior to molding, a movable mold member positioned to sealingly engage the fixed mold member, said members including passage means for admitting molding material into the mold, and a member movably carried by said movable member to be biased inwardly of the mold member to squeeze an armature held on the supporting surface by the magnet between the last mentioned member and the surface to prevent displacement of the armature by the pressure of the molding material and to prevent leakage of molding material past the armature.

References Cited by the Examiner
UNITED STATES PATENTS

| | | | |
|---|---|---|---|
| 2,559,861 | 7/1951 | Fay | 18—36 |
| 2,589,442 | 3/1952 | Siegrist | 18—42 XR |
| 2,789,346 | 4/1957 | Algier et al. | |
| 3,077,003 | 2/1963 | Hobson | 18—42 XR |
| 3,081,497 | 3/1963 | Scherry | 18—36 XR |
| 3,112,163 | 11/1963 | Alderfer | |

J. SPENCER OVERHOLSTER, *Primary Examiner.*
WILLIAM J. STEPHENSON, *Examiner.*